Nov. 19, 1968     A. J. GIRARD     3,411,851
APPARATUS FOR SPECTROMETRICALLY ANALYZING AND
SCANNING A RADIANT FLUX Filed Nov. 30, 1964     6 Sheets-Sheet 1

André Jean Girard
INVENTOR.

BY

Karl F. Ross
AGENT

André Jean Girard
INVENTOR.

BY Karl F. Ross
AGENT

Fig.11

André Jean Girard
INVENTOR.

Fig.12

Andre Jean Girard
INVENTOR.

BY Karl F. Ross
AGENT

United States Patent Office 3,411,851
Patented Nov. 19, 1968

3,411,851
APPARATUS FOR SPECTROMETRICALLY ANALYZING AND SCANNING A RADIANT FLUX
André Jean Girard, Chatillon-sous-Bagneux, France, assignor to Office National d'Etudes et de Recherches Aerospatiales, Chatillon-sous-Bagneux, Hauts-de-Seine, France, a corporation of France
Filed Nov. 30, 1964, Ser. No. 414,627
Claims priority, application France, Nov. 29, 1963, 955,571
14 Claims. (Cl. 356—83)

My present invention relates to an apparatus for the spectrometric analysis of radiant flux as disclosed in my copending applications Ser. No. 31,690 filed May 25, 1960, now Patent No. 3,211,048, Ser. No. 175,911 filed Feb. 27, 1962, now Patent No. 3,343,446; and Ser. No. 186,812 filed Apr. 11, 1962, now Patent No. 3,311,015.

A feature of a spectrometric apparatus as disclosed in these earlier applications is the utilization, at its input and output sides, of a radiation gate having a pattern of zones alternately forming part of a first and second multiplicity, the zones of one multiplicity differing in their transmissivity for incident radiation from the zones of the other multiplicity. The term "transmissivity," as used here, denotes the ability to direct radiation from a source to a destination by either direct traversal or reflection; thus, the two sets of zones may respectively be relatively transparent and relatively opaque, relatively reflective and relatively nonreflective, or endowed with a combination of these properties. The pattern formed by the zones is nonrepetitive in at least one reference direction, this direction lying in the optically effective plane of a dispersion means (e.g. a prism or a diffraction grating) forming part of an associated optical system which focuses the image of the input-side pattern upon the geometrically similar output side pattern in the presence of radiation of a particular wavelength for which the dispersion means is correspondingly adjusted; if the operating wavelength departs from the adjustment wavelength determined by the setting of the dispersion means, the projected image of the input-side pattern registers with the output-side pattern only partially or not at all. The relative dimensioning of the two patterns is so chosen that the projected image of the input pattern is coextensive with the output pattern, as by making the two patterns identical in size where the projection system has a magnification ratio of unity. Thus, in the coincidence position each zone of the projected image will register exactly with a corresponding zone of the output pattern whereby the entire radiant flux passed by the input gate will be either completely transmitted or completely blocked by the output gate, depending on whether corresponding zones of the two patterns are optically similar (i.e. either transmissive or nontransmissive) or complementary. In either case, radiant flux transmitted on wavelengths other than the adjustment wavelength will partly clear the two gates so that the output of a photoelectric transducer, positioned to receive the transmitted radiation, will have a finite amplitude in all positions of partial coincidence. This finite amplitude will be observable either over a wide range of wavelengths of incident flux, applied successively to the spectrometer input, or throughout a wide range of positions of the dispersion device if the latter is swung in its optically effective plane to scan a band of the spectrum containing the wavelength of a monochromatic flux transmitted by the apparatus.

If the output of the photoelectric transducer is plotted against the relative optical positions of the two patterns (i.e. the degree of offset of the projected image of the input pattern from the output pattern) in the case of such scanning displacement, the amplitude of that output will be zero as long as there is no coincidence at all. Upon beginning coincidence this amplitude starts to rise approximately linearly up to an off-position approaching full coincidence; the spacing of this off-position from the coincidence position may be termed a slit width by analogy with a conventional single-slit spectrometer having the same power of resolution. As explained in my earlier applications, such equivalent slit spectrometers inherently have a ratio of transmitted to incident radiation which is only a small fraction of that provided by the improved spectrometer described above. If the gate pattern consists, for example, of generally rectangular zones whose width varies progressively in the aforementioned reference direction, as disclosed in my application Ser. No. 31,690, the slit width is represented by the width of the narrowest zone of the input pattern. Since the width ratio from the widest to the narrowest zone may be of the order of 100:1, the increase in flux transmission as compared with a conventional single-slit spectrometer of like resolving power will be readily apparent.

When scanning (or an equivalent frequency change) progresses from the aforementioned off-position to the central position of exact registry, the amplitude of the output signal rises sharply to a peak (in the case of optically similar patterns) or drops equally sharply to substantially zero (in the case of optically complementary patterns). Beyond that centered position the signal will follow a curve which is symmetrical to that already described, i.e which has a steep ascending or descending slope up to another off-position and thereafter drops gradually to zero. If the cumulative area of one set of zones is equal to that of the other, the gently sloping portion of the curve will have approximately the same shape whether the patterns are optically identical or complementary, i.e. the amplitude in the off-position will be half the peak amplitude attained in the centered position with optically identical patterns.

The property just described has been utilized heretofore, in connection with the spectrometers disclosed in my earlier applications, to isolate the sharply sloping central portion of the output signal from the reminder of the curve by differentially combining the energies of two partial fluxes transmitted, either alternately or concurrently, over two optically distinct paths, i.e. a first path with optically identical input and output patterns and a second path with mutually complementary patterns. The final signal is then a narrow triangular pulse occurring whenever the coincidence condition is satisfied, i.e. when the wavelength of incident radiation passes through a value corresponding to the position of the dispersion device or whenever the dispersion device is moved through a position of adjustment corresponding to the existing wavelength; since, however, the slightly inclined outer flanks of the two curves cancel only imperfectly, some secondary peaks will appear on opposite sides of the main peak of the composite scanning curve.

In many instances, the need for providing separate flux paths represents an undesirable complication requiring not only a duplication of parts but also a high degree of conformity between corresponding components, e.g. in the design of the gate patterns and in the performance characteristic of the respective photoelectric transducers. Where a single photocell is used to receive the radiation alternately transmitted over the two paths, special switching and signal-storing means must be provided.

It is, therefore, the general object of my present invention to obviate the need for differential signal combination in the output of a spectrometer of the type described above.

More specifically, it is an object of this invention to provide means for effectively isolating the steeply sloping triangular pulse portion in the output signal of a one-path spectrometer of this character with suppression of the gently sloping flanks of its scanning curve.

If the flux transmitted over a single spectrometric path were converted directly into an electrical signal, with the dispersion device held in a position of adjustment corresponding to a desired wavelength of incident radiation, it would not be possible unequivocally to detect the presence of such wavelength if the frequency of the flux did not change; thus, in the case of identical patterns the signal amplitude would be finite in positions of both partial and complete coincidence, whereas with complementary patterns this amplitude would be zero in the case of complete coincidence and noncoincidence.

In a copending application filed Nov. 16, 1964, Ser. No. 411,254, I have disclosed a solution to the aforestated problems which involves the provision of means for relatively vibrating, or otherwise periodically displacing, the output-side pattern and the image of the input-side pattern as projected with the radiation to be analyzed, this relative displacement occurring in a direction in which the gate pattern is nonrepetitive whereby the amplitude of the resulting output signal varies sharply in the presence of radiant energy carried on the adjustment wavelength but changes only slightly or not at all if such wavelength is missing from the spectrum of the incident radiation. The reason for this behavior, as explained in my last-mentioned application, lies in the fact that the scanning curve described above has a small slope at all points except in the region of its maximum or minimum corresponding to the position of exact coincidence of the two patterns; thus, if the displacement is carried only over regions of partial coincidence and/or noncoincidence, the signal voltage of the output transducer varies only to a minor extent. This preferably vibratory discriminating motion may be of very small amplitude as compared with the dimension of the pattern in the spectrum-spread plane; in fact, a stroke length on the order of the effective slit width has been found satisfactory.

The arrangement just described, however, has certain limitations in regard to the type of gate pattern with which it may be employed. Thus, if the pattern is composed of rectangular zones in accordance with the disclosure of my application Ser. No. 31,690 so as to be nonrepetitive in only one dimension, a discriminating displacement carried out in a direction transverse to that dimension would be ineffectual. On the other hand, such a displacement could be carried out in the spectrum-spread direction only if the system were otherwise stationary, i.e. if no scanning of frequencies by rotation of the dispersion means in its optically effective plane is to be performed concurrently therewith; even so, oscillations in the spectrum-spread direction are permissible only if there is no danger that the discriminating displacement might lead to an apparent shift in the spectrum whereby a wavelength other than the one selected by the adjustment of the dispersion means would give rise to a coincidence signal.

It is, therefore, a particular object of my present invention to provide means for isolating a coincidence pulse in the output of a one-path spectrometer in a manner which is applicable to all types of gate patterns and which, even in the presence of polychromatic radiation, does not require any relative displacement of the patterns in a direction other than that of the spectrum spread.

It is also an object of this invention to provide an apparatus of the type referred to in which none of the parts other than the dispersion means need to be movable.

The foregoing objects are realized, in accordance with my present invention, by the provision of drive means for periodically sweeping the projected image of the input-side pattern past the output-side pattern in the spectrum-spread plane of the system over substantially the entire range of operating frequencies, i.e. the range of positions in which the two images will at least partly coincide in the presence of radiation of a predetermined wavelength or will register exactly at some point of the sweep in the presence of any radiation within a given band of wavelengths. This periodic scanning displacement will give rise, in the output of the associated photoelectric transducer, to a generally triangular voltage wave having a positive or negative peak at the vertex of each triangle when the incident radiation is monochromatic. With polychromatic radiation there will be several such peaks per cycle, the minimum separation of the individually ascertainable peaks depending of course upon the slit width of the instrument as determined by the gate pattern.

In order to isolate these peaks from the remainder of the signal curve, the invention further provides a filter circuit in the output of the transducer for suppressing at least the fundamental frequency of the signal wave which corresponds to the sweep frequency of the drive mechanism coupled with a movable element of the apparatus, along with any direct-current component that might be present. In principle, this movable element could be some part of the projection system or a support for either or both gate patterns, e.g. as described with reference to the vibratory discriminating displacement in my copending application Ser. No. 411,254 filed Nov. 16, 1964. In practice, however, I prefer to maintain the gate patterns stationary to minimize the risk of spontaneous disalignment, the scanning displacement being thus imparted to either the dispersion means or the collimator means of the projection system. Furthermore, although the desired periodic sweep could be brought about by a continuous rotation of the movable element, it will generally be simpler to provide an oscillatory sweep with an amplitude limited to the operative range of the apparatus.

The periodic scanning of the range of operating wavelengths, by an apparent relative displacement of the patterns in the spectrum-spread plane of the associated dispersion device, has also been described in my aforementioned copending application of Nov. 16, 1964 as a possible feature of the apparatus disclosed and claimed therein, but only in conjunction with means for concurrently subjecting the patterns to a discriminating displacement at a considerably faster rate and in a different direction.

The spectrometric apparatus according to my present invention requires only two patterns, one on the input side and one on the output side, one of which may be readily derived from the other with absolute fidelity by photographic reproduction, through the optical projection system of the apparatus itself, with the aid of a monochromatic radiation passing therethrough. This mode of duplication insures that the image of the input gate will register precisely, zone for zone, with the output gate in the adjustment position of the system, regardless of the magnification ratio of the system.

My present improvement, however, can also be realized with a single gate carrying both the input-side and the output-side pattern, both patterns being constituted by sections of alternately high and low transmissivity forming part of a single plate member positioned ahead of an optical system which includes both a reflector and an auto-collimator to reproject the incident radiation, after passage through the dispersion means, upon the same plate member which originally transmitted this radiation to the optical system; the input-side pattern is then formed on the side of the plate member facing away from the projection system whereas the output-side pattern is present on the side turned toward that system. Thus, one set of plate sections may in this case be transparent, the other set being opaque but reflective at least on the side facing the projection system; the outgoing radiation reflected by these latter sections is then directed toward the photoelectric receiver. The dispersion means of such spectrometer is advantageously constituted at a reflection grating so as to obviate the need for a separate reflecting element.

Since the projection system just described will reverse the angle of inclination of the incoming and outgoing rays, a pattern suitable for use in a single-gate spectrometer should be composed of centrally symmetrical sectors; again, a hyperboloidal pattern of the type disclosed in my application Ser. No. 175,911 will be highly suitable since its area is divided into quadrants with geometrically identical arrays of hyperboloidal curves in each quadrant, these arrays being symmetrically oriented with reference to a central point. The latter point may be the intersection of the common asymptotes of the curves of all quadrants; yet it is also possible, and in some cases advantageous, to reverse the arrays of the individual quadrants so that their respective asymptotes, common to all the curves of the array, intersect at the corners of a rectangle (specifically a square) centered on the point of symmetry, with the relative spacing of the curves of each array decreasing progressively along a diagonal line from the corner of the quadrant inwardly. If corresponding zones of diametrically opposite quadrants are optically equivalent, as by being respectively transparent and reflective (thus both transmissive of impinging radiation in the sense defined above), the output signal will reach a peak for the adjustment wavelength; if they are optically opposite, as by being both transparent or both opaque, substantially no radiation of that wavelength will reach the receiver so that the output signal will be zero in the coincidence position. It will thus be seen that, in this particular instance, optical equivalence does not correspond to identical physical properties.

The above and other features of my invention will become more fully apparent from the following detailed description, reference being made to the accompanying drawing in which.

Figure 1:
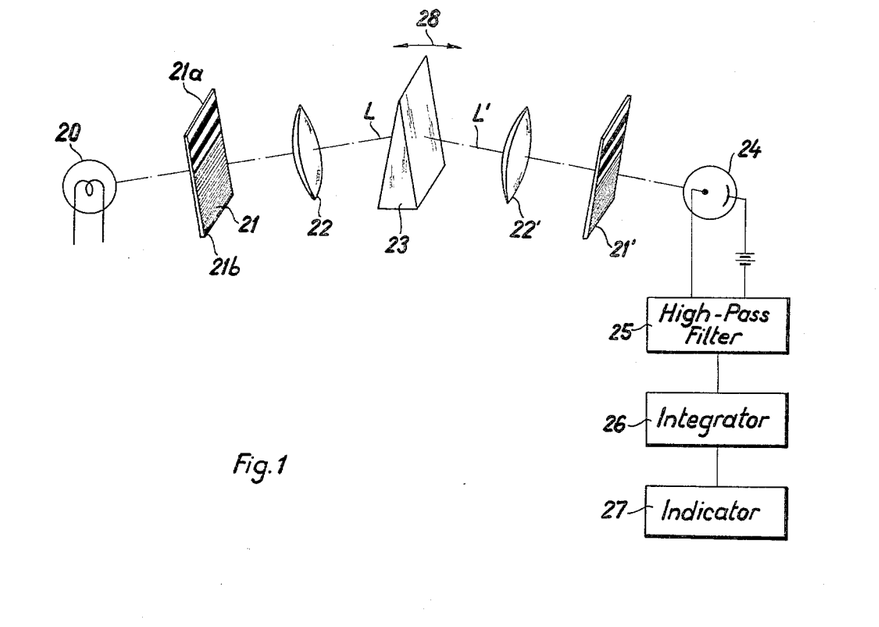
FIG. 1 is a diagrammatic view of a spectrometric apparatus embodying the invention.

Reference will first be made to FIG. 1, which shows a spectrometer comprising a source of radiant energy illustrated schematically as a lamp 20; an input gate 21 transluminated by the light rays from source 20; an input collimator shown diagrammatically as a lens 22; a dispersion device, illustrated as a prism 23; an output collimator shown diagrammatically as another lens 22'; an output gate 21' transluminated by dispersed rays of light L' focused upon it by the collimator 22'; a photoelectric cell 24 positioned to receive the rays L' which traverse the gate 21'; and an output circuit for the photocell 24, including a high-pass filter 25, an integrator 26 and a visual or other type of signal indicator 27.

The radiation gates 21 and 21' are each shown composed of alternately transparent and opaque zones whose boundary lines are perpendicular to the spectrum-spread plane of the prism 23. The spacing of these boundary lines within that plane, and thus the width of the rectangular zone, varies progressively from the center of the pattern outwardly and in this particular instance decreases according to a nonlinear law from one side $21a$ to the opposite side $21b$ of the rectangular pattern (as specifically indicated for the input gate 21).

The nonlinear law referred to, as disclosed in my application Ser. No. 31,690, may be a hyperbolic one according to which, at least in a first approximation, the width of each zone is inversely proportional to the distance of its remote boundary line from the edge $21a$.

It will be assumed that the magnification ratio of the projection system 22, 23, 22' equals unity and that the patterns of the two gates 21, 21' are geometrically and optically identical. If the projected image of gate 21 exactly coincides with the pattern of gate 21', which will be true for only one wavelength in a given position of prism 23, all the flux of monochromatic light traversing the transparent zones of input gate 21 (thus approximately half the flux incident upon the gate) will also clear the transparent zones of output gate 21' to energize the photocell 24''; for any other wavelength, and therefore also for any other position of prism 23 with the same wavelength, the flow of luminous energy to the photocell will be sharply reduced or completely discontinued. Thus, if the light from source 20 is monochromatic and if the prism is swung in its optically effective plane, as indicated by arrow 28, the output voltage of photocell 24 follows a scanning curve 29 as shown in FIG. 2 (full lines) for the various relative positions of the output gate 21' and the projected image 21'' of input gate 21 as indicated below curve 29 in FIG. 2; for the sake of clarity the outline of image 21'' has been shown slightly smaller than that of the pattern 21'.

Curve 29 has a gently sloping branch $29a$ (shown idealized as a straight line) which rises from zero at a position $P_1$, in which the patterns 21' and 21'' barely touch, to a position $P_2$ in which these patterns are nearly but not quite coincident; the curve then ascends steeply along a flank $29b$ of a triangular pulse whose apex $P_3$ represents the position of exact registry of the two patterns. The curve then continues symmetrically with a steep descending flank $29c$ to a position $P_4$ and thereafter with a gently sloping branch $29d$ to a position $P_5$ where its amplitude returns to zero.

The distance of the two off-positions $P_2$ and $P_4$ from the central position $P_3$ is a small fraction of the length of the pattern in the direction of scan and corresponds, in fact, to the width of the narrowest zone of the pattern, i.e. the zone closest to line $21b$ in FIG. 1. This distance may thus be termed the effective slit width of the spectrometer. Furthermore, the amplitude $A_2$, $A_4$ of curve 29 at points $P_2$ and $P_4$ equals substantially half the amplitude $A_3$ at point $P_3$.

Figure 2:
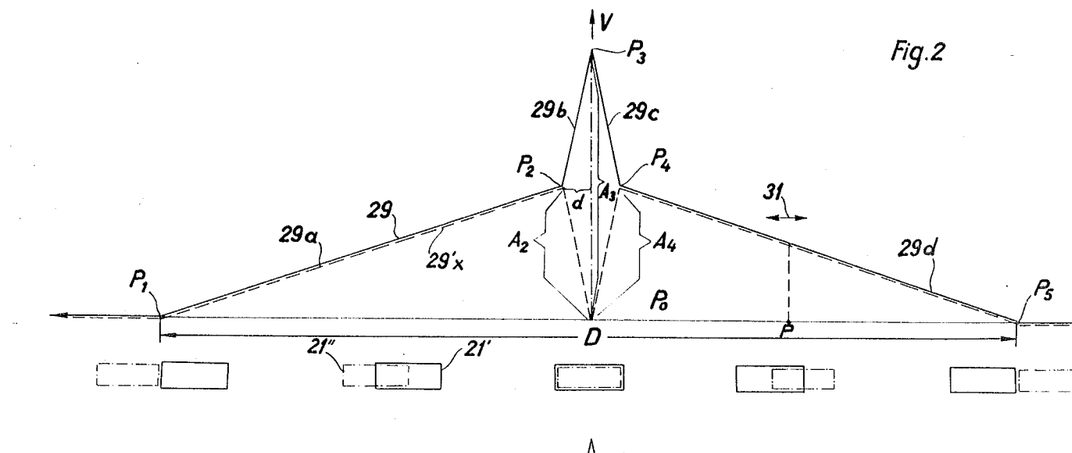
FIG. 2 is a graph representing a scanning curve obtainable with the spectrometric apparatus of FIG. 1 but without the present improvement.

If either of the two gates 21, 21' were replaced by a geometrically identical but optically complementary gate, the scanning curve in FIG. 2 would have the configuration indicated in dotted lines at $29x$, this curve in its idealized shape following closely the curve 29 between points $P_1$ and $P_2$ as well as between points $P_4$ and $P_5$. In the coincidence position represented by point $P_3$ on curve 29, however, curve $29x$ drops sharply to a point $P_0$ along the abscissa so as to give rise to a sharp pulse $P_2$—$P_0$—$P_4$ which is the negative of the pulse $P_2$—$P_3$—$P_4$ of curve 29.

Figure 3:
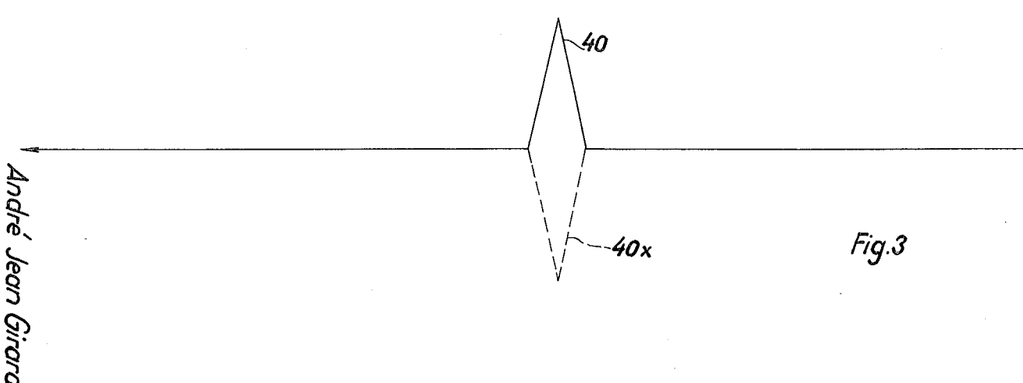
FIG. 3 is a graph similar to FIG. 2, showing the filtered output signal obtainable with an improved apparatus according to the present invention in the case of a single scanning sweep.

Let it be assumed that the oscillation represented by arrow 28 (FIG. 1) is performed at such a rate that the scanning interval T, required to sweep the distance D between points $P_1$ and $P_5$ of FIG. 2, corresponds to a repetition frequency $f=1/T$ which is lower than the cutoff frequency of the high-pass filter 25. This filter will then suppress at least the fundamental sweep frequency $f$, and preferably also a large proportion of the higher harmonics represented by other terms of the Fourier series into which the curve 29 can be developed, but will pass freely at least the fundamental frequency $F=1/t$ ($t$ being the time required to sweep the distance $2d$ between points $P_2$ and $P_4$) and some harmonics of the narrow triangular peak $P_2$—$P_3$—$P_4$ (or trough $P_2$—$P_0$—$P_4$) so as to produce an output in the form of a positive pulse 40 (or a negative pulse 40x) as illustrated in FIG. 3. The pulse 40 or 40x has substantially the same base width as the corresponding peak $P_2$—$P_3$—$P_4$ or trough $P_2$—$P_0$—$P_4$ of curve 29 or 29x, the pulse amplitude being of course dependent on the parameters of the filter 25 and any amplifier possibly connected thereto or forming part thereof.

Since the ratio $D:d$ and therefore also the ratio $T:t$ may be very high, e.g. on the order of 1000, the two fundamental frequencies $f$ and $F$ are readily separable even by relatively simple filters. Thus, filter 25 may be of a conventional type with an attenuation of about 6 db per octave, at least in the vicinity of frequency $f$, though of course higher attenuation ratios (e.g. of 24 db octave) will insure an even better performance.

Figure 4:
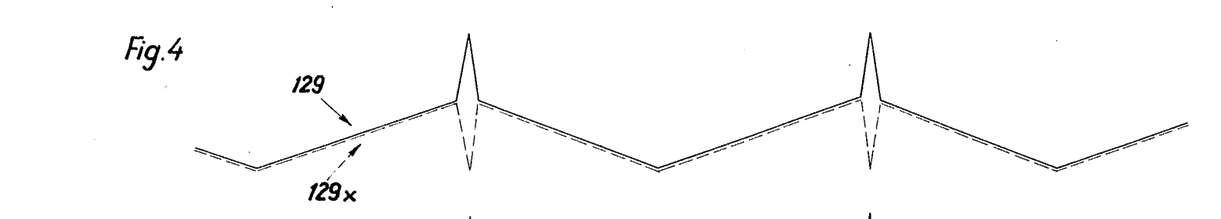
FIGS. 4 and 5 are views similar to FIGS. 2 and 3, showing the periodic output of the apparatus of FIG. 1 before and after filtering, respectively.
Figure 5:
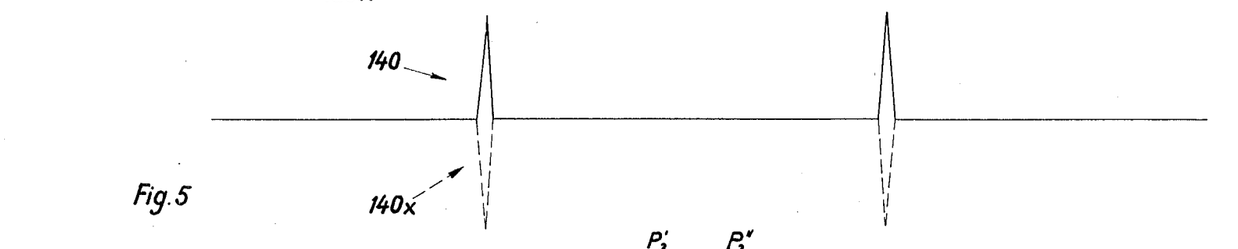

If the scanning sweep represented by arrow 28 (FIG. 1) is repeated periodically, with a constant amplitude D corresponding to the extent of the operative range for monochromatic radiation, an output signal conforming to the curve 129 (or 129x) of FIG. 4 will be produced by the photocell and will give rise to a filtered pulse train 140 (or 140x) as shown in FIG. 5. The periodically recurring pulses of either polarity can then be integrated in circuit 26 to provide a substantially constant output voltage readable on the indicator 27, the magnitude of this output voltage depending of course on the amplitude of the pulses which remains substantially unchanged as long as the incident radiation does not vary.

Figure 6:
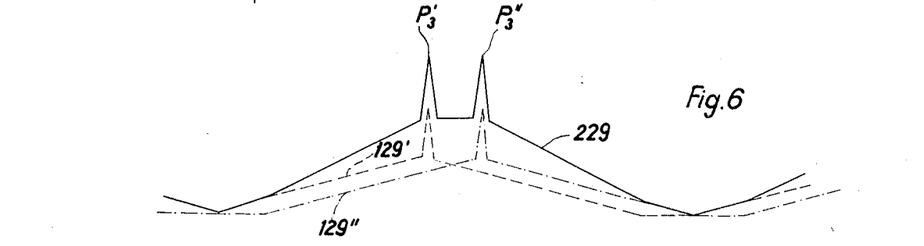
FIGS. 6 and 7 are graphs similar to FIGS. 4 and 5, showing the unfiltered and the filtered output of the apparatus in the presence of polychromatic radiation.
Figure 7:
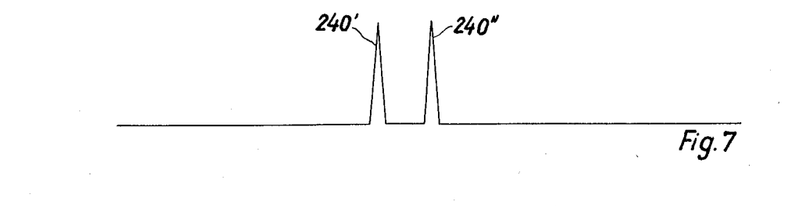

FIGS. 6 and 7 show the output signal before and after filtering, respectively, in the presence of two distinct operating wavelengths which individually would produce the curves 129′, 129″ of FIG. 6 but which jointly manifest themselves as a curve 229 with two peaks $P_3′$, $P_3″$. Filter 25 again suppresses the lower frequencies so as to pass only the two pulses 240′, 240″ corresponding to these peaks. It will be understood that the minimum separation of the peaks $P_3′$, $P_3″$ corresponds substantially to the slot width $d$. It will also be noted that the scanning sweep of an apparatus having an output as represented in FIG. 6 is slightly greater than the base of the large triangle of curve 129′ or 129″. The scanning sweep in FIGS. 4 and 6 could also be somewhat foreshortened, with a consequent rise in the fundamental frequency $f$ and with an increase in the D–C component to be removed by the filter.

Naturally, the peaks $P_3′$ and $P_3″$ may differ in amplitude, depending upon the relative intensity of the radiation carried on these particular wavelengths. If it were desired to register these pulses individually, the indicator 27 could be designed as a conventional and suitably calibrated oscilloscope, with omission of the integrator 26, so as to reveal not only the nature of the radiation (whether mono- or polychromatic) but also the exact location of each frequency in the incident band, as more fully described hereinafter with reference to FIG. 4.

Figure 8:
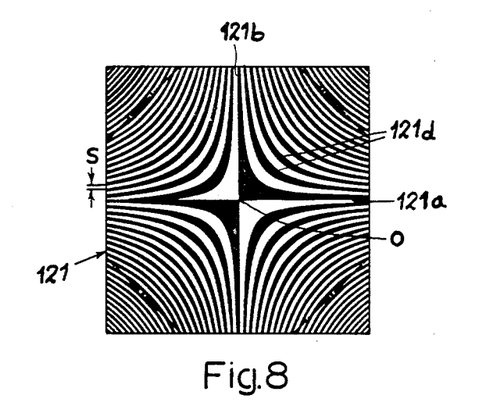
FIGS. 8, 9 and 10 are face views of different radiation gates adapted to be used in the apparatus of FIG. 1.

The gate 121 shown in FIG. 8 has a square area divided into four quadrants by two intersecting median lines 121a, 121b which are the common asymptotes of four families of equilaterally hyperbolical curves defining alternately transparent and opaque zones 121c, 121d in each of these quadrants. The arrays of curves in the four quadrants are symmetrical about the center 0 of the gate pattern, the spacing of successive curves within this quadrant decreasing progressively from the center 0 outwardly along one of the diagonals of the square. Any line parallel to one of the two asymptotes 121a, 121b, however, intercepts successive curves along points of intersection having the same mutual spacing, this spacing having its minimum value $s$ along the sides of the square; the distance $s$ has the same function as the width of the narrowest zone in the pattern of FIG. 1, being thus a measure of the effective slit width.

The hyperbolical gate pattern 121, representative of a type of such patterns described in my application Ser. No. 175,911 is nonrepetitive in both orthogonal directions and is advantageously so oriented that its asymptotes are respectively parallel and perpendicular to the spectrum-spread direction of the associated dispersion device. This pattern can also be modified, as illustrated in dot-dash lines, by trimming the corners of the square in order to eliminate the portions of greatest density of the hyperbolic curves. Each side of the square pattern may have in practice a length of, say 30 mm., with a slit width $s$ equal to 0.1 mm. In a pattern of similar overall size but composed of zones of progressively varying width, as shown in FIG. 1, the width of the narrowest zone (thus, the effective slit width) may be 0.03 mm. The distance D in FIG. 1, measured along the output pattern, equals 60 mm. in such cases.

The pattern 221 shown in FIG. 8 is of the same general type as the pattern 21, 21′ of FIG. 1, i.e. with generally rectangular zones separated by parallel boundaries whose spacing varies progressively according to a nonlinear law, except that the pattern is symmetrically duplicated on opposite sides of a transverse median line.

Figure 9:
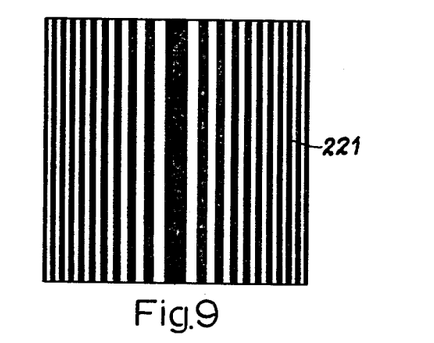

FIG. 9 shows a pattern 321 which differs from pattern 121 (FIG. 8) in that the arrays of the individual quadrants have been reversed so that the zones 321c, 321d of each array decrease in width from the corners of the square inwardly toward the center of the pattern. The asymptotes, such as those indicated at 321a and 321b, are individual to the family of curves of each quadrant and intersect at respective corners of the square. An advantage of this type of pattern is that the narrowest zone widths occur at locations closer to the center of the pattern, thus reducing the effect of optical aberrations of the projection system upon the performance of the apparatus.

Figure 11:
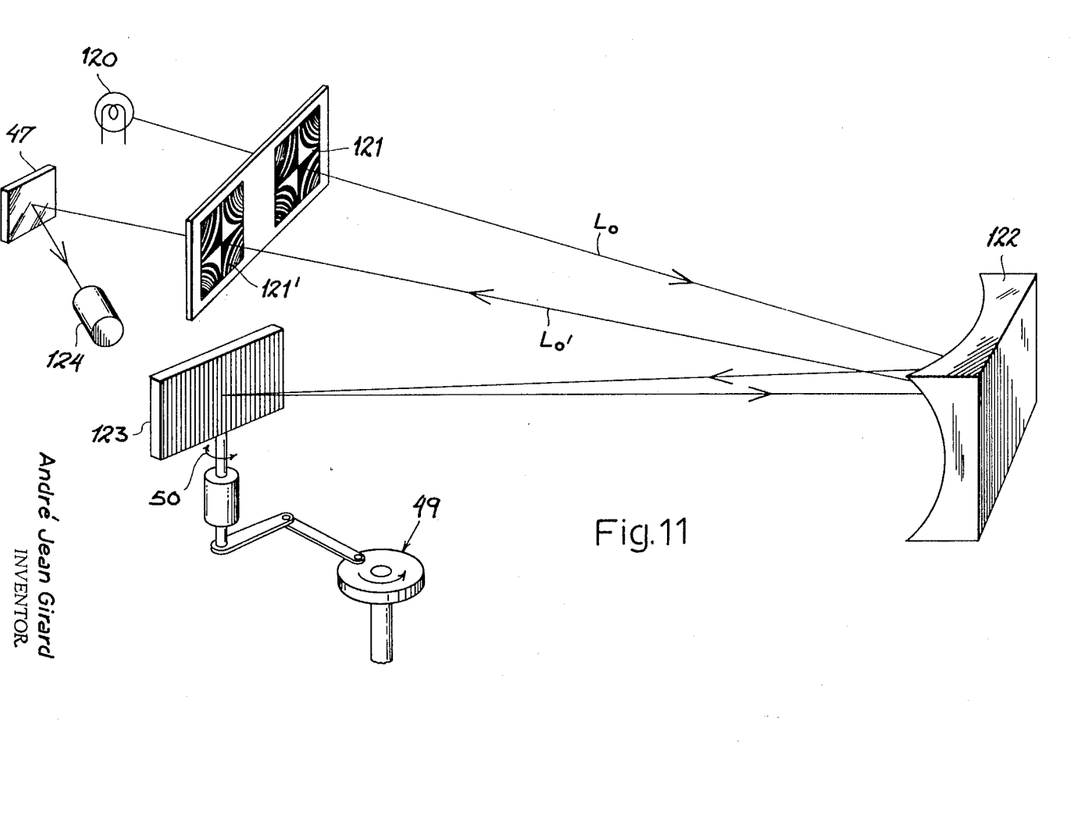
FIG. 11 diagrammatically illustrates another type of spectrometer embodying the invention.

FIG. 11 shows a modified spectrometer with a light source 120, an input gate 121 of the type shown in FIG. 3, a collimator 122 in the form of a concave mirror, a dispersion element constituted by a reflecting grating 123, an output gate 121′ identical with input gate 121, a plane mirror 47 beyond gate 121′ and a photoelectric transducer 124 working into an output circuit not further illustrated. Gates 121, 121′ have a common stationary support 132. A driving mechanism 49, illustrated diagrammatically, periodically swings the grating 123 about a vertical axis as indicated by the arrow 50.

The grating 123, in the mid-position of its swing, directs a monochromatic central light ray $L_0$ of the desired adjustment wavelength from collimator 122 back toward that collimator and thence to the center of output gate 121′, as illustrated at $L_0′$. Slanting rays of the same wavelength are similarly reflected but with reversal of their angle of incidence, hence they impinge upon zones of gate 121′ which are diametrically opposite with reference to the zones of gate 121 through which they passed originally.

Since diametrically opposite quadrants of both patterns are optically alike and since the two gates are identical, the output of photocell 124 will conform to curve 29 of FIG. 2.

Figure 12:
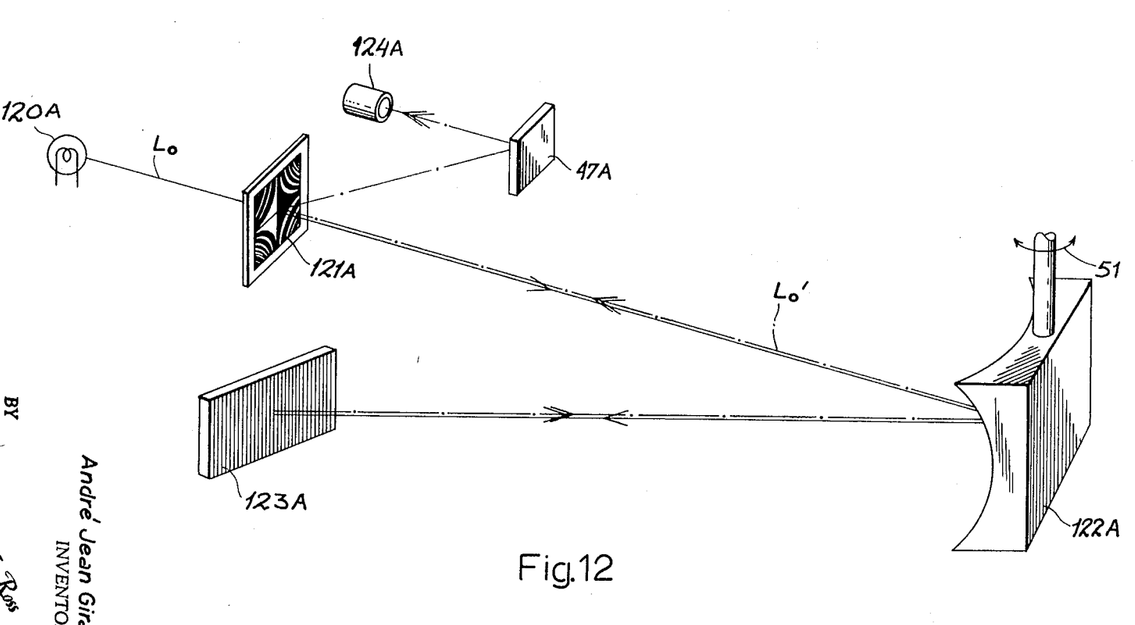
FIG. 12 is a view similar to FIG. 11, illustrating a further embodiment.

In FIG. 12 I have illustrated a simplified spectrometer using but a single gate member 121A in combination with an optical system generally similar to that of FIG. 11, this system comprising a collimating mirror 122A and a grating 123A as well as a plane mirror 47A and a photoelectric receiver 124A. Mirror 122A operates as an auto-collimator, monochromatic ray $L_0$ from source 120A being reflected back upon itself (as shown at $L_0′$) by both the mirror 122A and the grating 123A when the latter is at the proper angle corresponding to its adjustment position for that particular wavelength. Arrow 51 indicates the periodic scanning sweep of reflector 122A about its axis perpendicular to the dispersion plane, under the control of a drive mechanism similar to that shown in FIG. 11, the grating 123A being here stationary.

The rear face of gate member 121A, visible in the drawing and turned toward the optical system 122A, 123A bears an output pattern constituted by alternately reflective and non-reflective surfaces of respective transparent and opaque sections into which the plate 121A is divided; the front face of this plate constitutes the corresponding input pattern, represented by the opposite surfaces of these sections, and is inherently of identical configuration. The plate 121A is slightly inclined with reference to the perpendicular to the central ray $L_0$ so that the impinging rays of the outgoing beam may be reflected toward mirror 47A.

The pattern of gate 121A is distinguished from that of gates 121, 121' in that diagonally opposite zones are physically different from each other, i.e. an opaque zone in one quadrant corresponds to a transparent zone in the diagonally opposite quadrant and vice versa. As explained before, the transparent zones of the input pattern are here optically equivalent to the opaque zones of the output pattern since the latter, being reflective, also transmit the incident radiation. Thus, with the arrangement of FIG. 12 the output of photocell 124 will again follow the curve 29 of FIG. 2; if a pattern similar to that of gate 121 were substituted, the output voltage would correspond to curve 29x.

Figure 10:
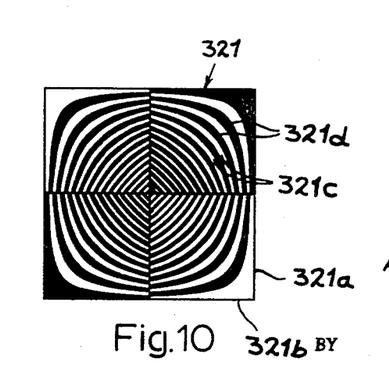

Naturally, a pattern such as that shown at 329 in FIG. 10 could be used in both the apparatus of FIG. 11 and that of FIG. 12.

Figure 13:
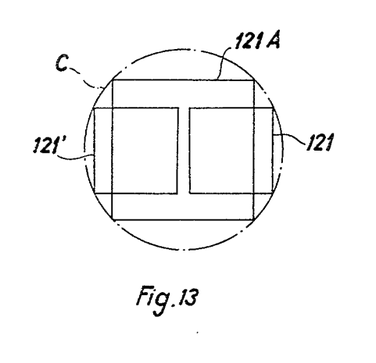
FIG. 13 is a diagram showing the relative proportioning of the gate patterns in the system of FIGS. 10 and 11.

Besides eliminating the need for a second gate member through the use of the autocollimation principle, the apparatus of FIG. 12 also has optical advantages compared with a two-gate apparatus of the type shown in FIG. 11. Thus, I have indicated at C in FIG. 13 an imaginary circle representing the boundary of a region within which the aberrations of an associated projection system are of tolerable magnitude; it will be seen that two juxtaposed gate patterns 121, 121', fitted inside this circle, are substantially smaller than a single gate pattern 121A inscribed therein. Thus, a larger gate surface with consequently increased luminosity can be used, under otherwise equal conditions, with the autocollimating system illustrated in FIG. 12.

Figure 14:
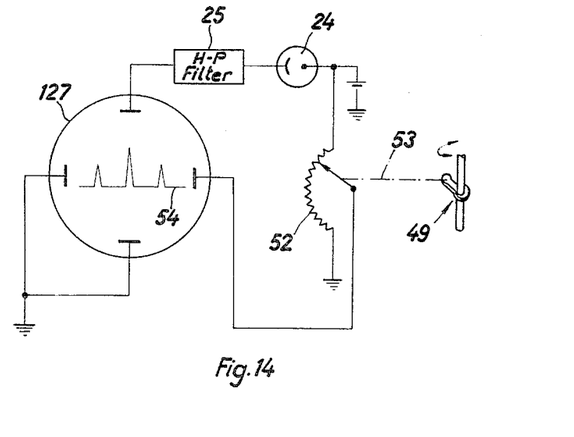
FIG. 14 diagrammatically illustrates an indicator adapted to be used with the apparatus of FIG. 1, 11 or 12.

In FIG. 14 I have diagrammatically illustrated an oscilloscope-type indicator adapted to be used with any of the spectrometric instruments described above. This indicator comprises a cathode-ray tube 127 with the usual horizontal and vertical deflecting electrodes, one of the vertical electrodes being energized from photocell 24 via filter 25, one of the horizontal electrodes being tied to a source of variable voltage here shown as a potentiometer 52. The slider of the potentiometer is connected via a linkage 53 with the oscillating shaft of the drive mechanism 49 which may carry a reflection grating, as in FIG. 11, or some other displaceable part of the apparatus. The luminous trace 54 appearing on the screen of tube 127 includes several pips representing different operating wavelengths within the band of radiation received by the apparatus.

My invention is, of course, not limited to the specific type of pattern shown by way of example, nor to the particular constructive solutions disclosed; thus, the various modes of operation described in connection with certain embodiments may be used, individually or in compatible combinations, with other embodiments, as for example by the positioning of the two gates of the type shown at 121, 121' on opposite sides of a dispersive prism in lieu of the gates 21, 21' of FIG. 1. Also, if desired, the gratings 123, 123A or the mirrors 122, 122A could be continuously rotated (though not necessarily at constant speed) instead of oscillated about their axis. These and other modifications, readily apparent to persons skilled in the art, are intended to be embraced within the spirit and scope of my invention except as otherwise limited by the appended claims.

I claim:

1. An apparatus for the spectrometric analysis of a flux of radiation, comprising radiation-gate means with an input side and an output side each exhibiting a substantially planar pattern of adjoining zones alternately forming part of a first and a second multiplicity of zones, said radiation-gate means including a support for at least one of said patterns, the zones of said first multiplicity having a transmissivity for incident radiation different from that of the zones of said second multiplicity, said pattern being non-repetitive in at least one reference direction; a projection system for directing incident radiation, transmitted by the zones of one multiplicity of the input-side pattern, onto the output-side pattern of said gate means, said system including dispersion means with a spectrum-spread plane parallel to said direction for casting upon said output-side pattern an exactly registering image of said input-side pattern as projected with an operative wavelength of incident radiation bearing a predetermined relationship with the relative position of said radiation-gate means and said system; photoelectric transducer means positioned to receive radiation transmitted by one multiplicity of zones of said output-side pattern, the rate of reception of radiant energy by said transducer means attaining an extreme value for said predetermined wavelength and having finite other values for all other wavelengths projected with partial coincidence of said patterns; drive means for periodically sweeping the projected image of said input-side pattern past said output-side pattern in said spectrum-spread plane over substantially the full range of operating wavelengths by relatively moving said support and at least part of said projection system whereby said rate of reception periodically reaches said extreme value in the presence of radiation of a predetermined wavelength within said range; and filter means connected to said transducer means for isolating a pulse corresponding to said extreme value in the output of said transducer means by suppressing at least the fundamental sweep frequency of said drive means in said output.

2. An apparatus as defined in claim 1 wherein said zones are bounded by substantially hyperboloidal curves having a common axis and common asymptotes, the spacing of said curves varying progressively along said axis, said asymptotes being respectively parallel and perpendicular to said reference direction.

3. A apparatus as defined in claim 2 wherein each of said patterns extends over a generally rectangular area divided into quadrants, said hyperboloidal curves being duplicated in all of said quadrants in geometrically identical arrays symmetrical with reference to the center of the rectangle.

4. An apparatus as defined in claim 3 wherein the asymptotes of each array intersect substantially at a corner of the rectangle, the relative spacing of the curves of the array decreasing along a diagonal line inwardly from said corner.

5. An apparatus as defined in claim 1 wherein said zones are bonded by substantially straight lines whose spacing varies progressively according to a nonlinear law, said lines being generally perpendicular to said reference direction.

6. An apparatus as defined in claim 1 wherein said radiation-gate means comprises a first plate member bearing said input-side pattern and a second plate member bearing said output-side pattern, said dispersion means being coupled with said drive means and disposed between said members.

7. An apparatus as defined in claim 1 wherein said projection system includes reflector means for said radiation, said input-side and output-side patterns being closely juxtaposed on one side of said system.

8. An apparatus as defined in claim 7 wherein said drive means is coupled with said reflector means for oscillating same.

9. An apparatus as defined in claim 8 wherein said dispersion means comprises a reflection grating forming part of said reflector means.

10. An apparatus as defined in claim 7 wherein said projection system includes auto-collimator means for said radiation, said radiation-gate means comprising a single plate member divided into sections which form the zones of said input-side pattern on the side of said member facing away from said system and which form the zones of said output-side pattern on the side of said member turned toward said system, the pattern of said sections being centrally symmetrical.

11. An apparatus as defined in claim 10 wherein said one multiplicity of zones of said input-side pattern are transparent to said radiation, said one multiplicity of zones of said output-side pattern being reflective.

12. An apparatus as defined in claim 1 wherein said optical system includes collimator means coupled with said drive means for displacement relative to said support and said dispersion means.

13. An apparatus for the spectrometric analysis of a flux of radiation, comprising radiation-gate means with an input side and an output side each exhibiting a substantially planar pattern of adjoining zones alternately forming part of a first and a second multiplicity of zones, said radiation-gate means including a support for at least one of said patterns, the zones of said first multiplicity having a transmissivity for incident radiation different from that of the zones of said second multiplicity, said pattern being nonrepetitive in at least one reference direction; a projection system for directing incident radiation, transmitted by the zones of one multiplicity of the input-side pattern, onto the output-side pattern of said gate means, said system including dispersion means optically effective and swingable in a plane parallel to said direction for casting upon said output-side pattern an exactly registering image of said input-side pattern as projected with different operating wavelengths of incident radiation in respective positions of adjustment of said dispersion means; photoelectric transducer means positioned to receive radiation transmitted by one multiplicity of zones of said output-side pattern, the rate of reception of radiant energy by said transducer means attaining an extreme value for an operating wavelength corresponding to a selected position of adjustment while having finite other values for all other wavelengths projected with partial coincidence of said patterns; drive means for periodically scanning said operating wavelengths by oscillating said dispersion means in said plane over substantially the full range of positions of exact and partial coincidence of said output-side pattern with the image of said input-side pattern as projected with radiation of a predetermined operating wavelength whereby said rate of reception periodically reaches said extreme value in the presence of radiation of any of said predetermined wavelengths; filter means connected to said transducer means for isolating a pulse corresponding to said extreme value in the output of said transducer means by suppressing at least the fundamental oscillation frequency of said drive means in said output; and pulse-indicating means connected to the output of said filter means.

14. An apparatus as defined in claim 13 wherein said pulse-indicating means includes an oscilloscope.

No references cited.

JEWELL H. PEDERSEN, *Primary Examiner.*

B. LACOMIS, *Assistant Examiner.*